US011529743B2

(12) United States Patent
Komoda et al.

(10) Patent No.: US 11,529,743 B2
(45) Date of Patent: Dec. 20, 2022

(54) HANDLING APPARATUS, CONTROL APPARATUS, AND RECORDING MEDIUM

(71) Applicant: KABUSHIKI KAISHA TOSHIBA, Tokyo (JP)

(72) Inventors: Kazuma Komoda, Kawasaki Kanagawa (JP); Seiji Tokura, Kawasaki Kanagawa (JP); Haruna Eto, Kawasaki Kanagawa (JP); Ping Jiang, Ota Tokyo (JP); Atsushi Sugahara, Kawasaki Kanagawa (JP); Akihito Ogawa, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 17/004,183

(22) Filed: Aug. 27, 2020

(65) Prior Publication Data
US 2021/0291378 A1 Sep. 23, 2021

(30) Foreign Application Priority Data

Mar. 19, 2020 (JP) .............................. JP2020-049244

(51) Int. Cl.
*B25J 9/00* (2006.01)
*B25J 9/16* (2006.01)
(Continued)

(52) U.S. Cl.
CPC ........... *B25J 9/1697* (2013.01); *B25J 9/1653* (2013.01); *B25J 9/1674* (2013.01); *B25J 9/1682* (2013.01);
(Continued)

(58) Field of Classification Search
CPC ...... B25J 9/1697; B25J 9/1653; B25J 9/1674; B25J 9/1682; B25J 13/082; B25J 13/088;
(Continued)

(56) References Cited

U.S. PATENT DOCUMENTS 11,407,118 B1\* 8/2022 Augenbraun .......... B25J 19/023
2010/0004778 A1 1/2010 Arimatsu et al.
(Continued)

FOREIGN PATENT DOCUMENTS

EP 3 617 936 A1 3/2020
JP 6363294 B1 7/2018
(Continued)

OTHER PUBLICATIONS

Mahler et al., "Learning ambidextrous robot grasping policies," Science Robotics 4, eaau4984 (Jan. 16, 2019), 11 pages.

*Primary Examiner* — Ian Jen
(74) *Attorney, Agent, or Firm* — Finnegan, Henderson, Farabow, Garrett & Dunner, LLP

(57) ABSTRACT

A handling apparatus has an arm having a joint; a holding portion attached to the arm and configured to hold an object; a sensor configured to detect a plurality of the objects; and a control apparatus configured to control the arm and the holding portion, wherein the control apparatus is configured to calculate an ease of holding the object by the holding portion as a score based on information acquired by the sensor with respect to each object and each holding method, select the object to hold and the holding method according to the score, and calculate a position for holding the selected object and an orientation of the arm.

20 Claims, 8 Drawing Sheets

(51) Int. Cl.
  *B25J 13/08*   (2006.01)
  *B25J 15/00*   (2006.01)
  *B25J 15/06*   (2006.01)
  *B25J 17/02*   (2006.01)

(52) U.S. Cl.
  CPC ........... *B25J 13/082* (2013.01); *B25J 13/088* (2013.01); *B25J 15/0028* (2013.01); *B25J 15/0616* (2013.01); *B25J 17/02* (2013.01)

(58) Field of Classification Search
  CPC .... B25J 15/0028; B25J 15/0616; B25J 17/02; G05B 2219/40053
  See application file for complete search history.

(56) References Cited

U.S. PATENT DOCUMENTS

| | | |
|---|---|---|
| 2018/0272535 A1 | 9/2018 | Ogawa et al. |
| 2019/0283241 A1 | 9/2019 | Eto et al. |
| 2019/0283249 A1 | 9/2019 | Komoda et al. |
| 2021/0060769 A1 | 3/2021 | Eto et al. |
| 2021/0078811 A1 | 3/2021 | Komoda et al. |

FOREIGN PATENT DOCUMENTS

| | | |
|---|---|---|
| JP | 2019-155535 A | 9/2019 |
| JP | 2019-162684 A | 9/2019 |
| JP | 2019-162685 A | 9/2019 |
| JP | 2021-37608 A | 3/2021 |
| JP | 2021-41513 A | 3/2021 |

\* cited by examiner

HANDLING APPARATUS, CONTROL APPARATUS, AND RECORDING MEDIUM

This application is based upon and claims the benefit of priority from Japanese Patent Application No. 2020-49244, filed on Mar. 19, 2020; the entire contents of which are incorporated herein by reference.

FIELD

Embodiments described herein relate generally to a handling apparatus, a control apparatus, and a non-volatile recording medium storing a control program.

BACKGROUND

Conventionally, a handling apparatus having an end effector configured to hold an object is known. To realize the automation of the transfer operation in a logistics site, it is required that the objects having various shapes, sizes, and weights can be held. When the objects are held by using the handling apparatus, much arithmetic processing are necessary to determine a holding strategy including a holding position, a holding method, an orientation of the robot arm, and the like. When the loading state of the objects is complicated, the time for the necessary arithmetic processing to determine the holding strategy increases.

DETAILED DESCRIPTION OF EMBODIMENTS

Hereinafter, a handling apparatus, a control apparatus, and a recording medium storing a control program according to an embodiment will be described by referring to figures. In the description below, configurations having the same or similar function will be assigned with the same reference sign. The redundant descriptions of these configurations may be omitted. In the embodiment, the recitation "according to an element A" means "at least according to the element A", and the case according to other element in addition to the element A is included. The recitation "according to A" is not limited to the case of directly using the element A, and the case according to the results of performing calculation or processing with respect to the element A is included. The element A refers to an arbitrary element (for example, arbitrary information).

Figure 1:
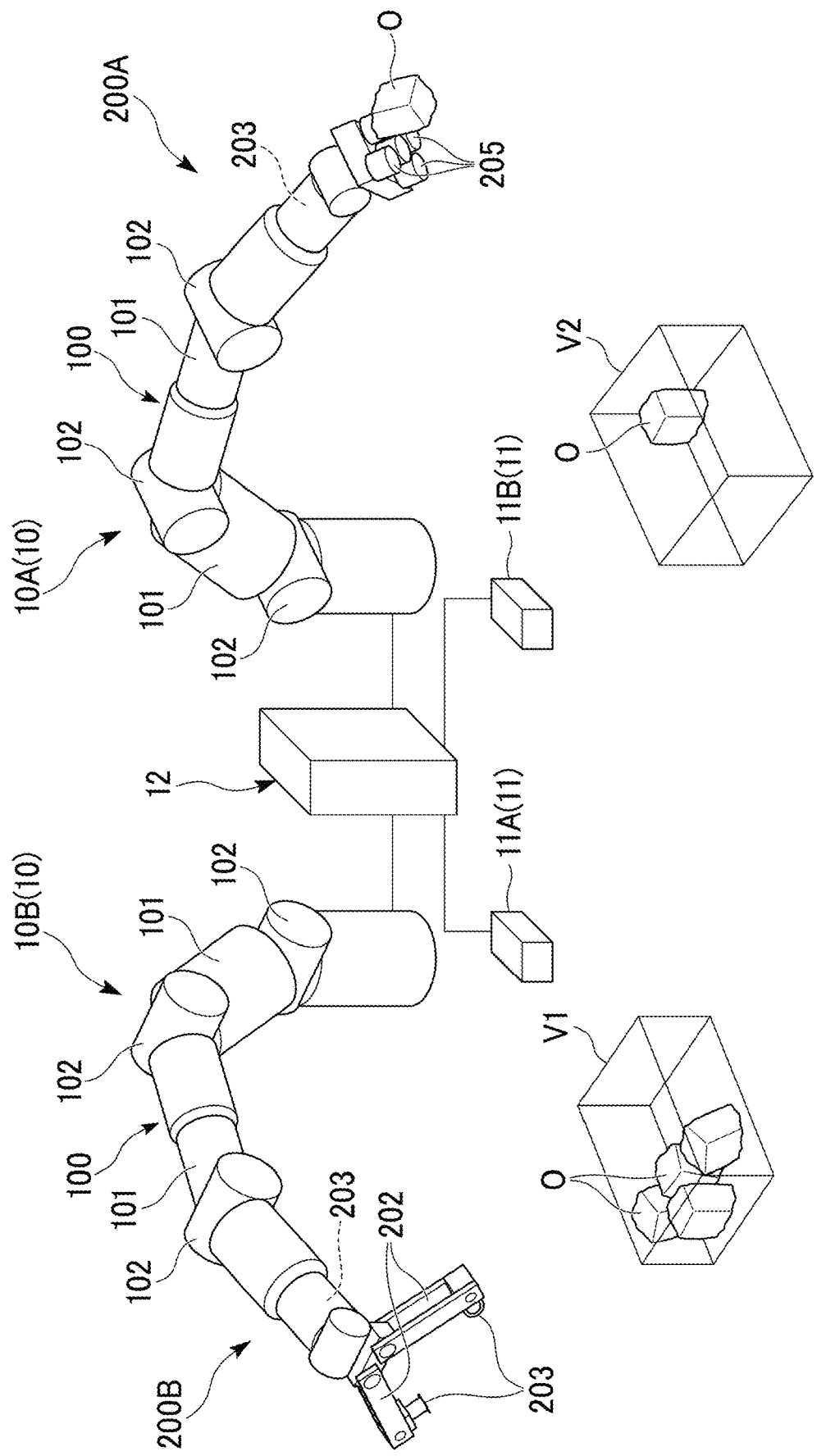
FIG. 1 is a perspective view schematically showing a handling apparatus according to an embodiment.
Figure 2:
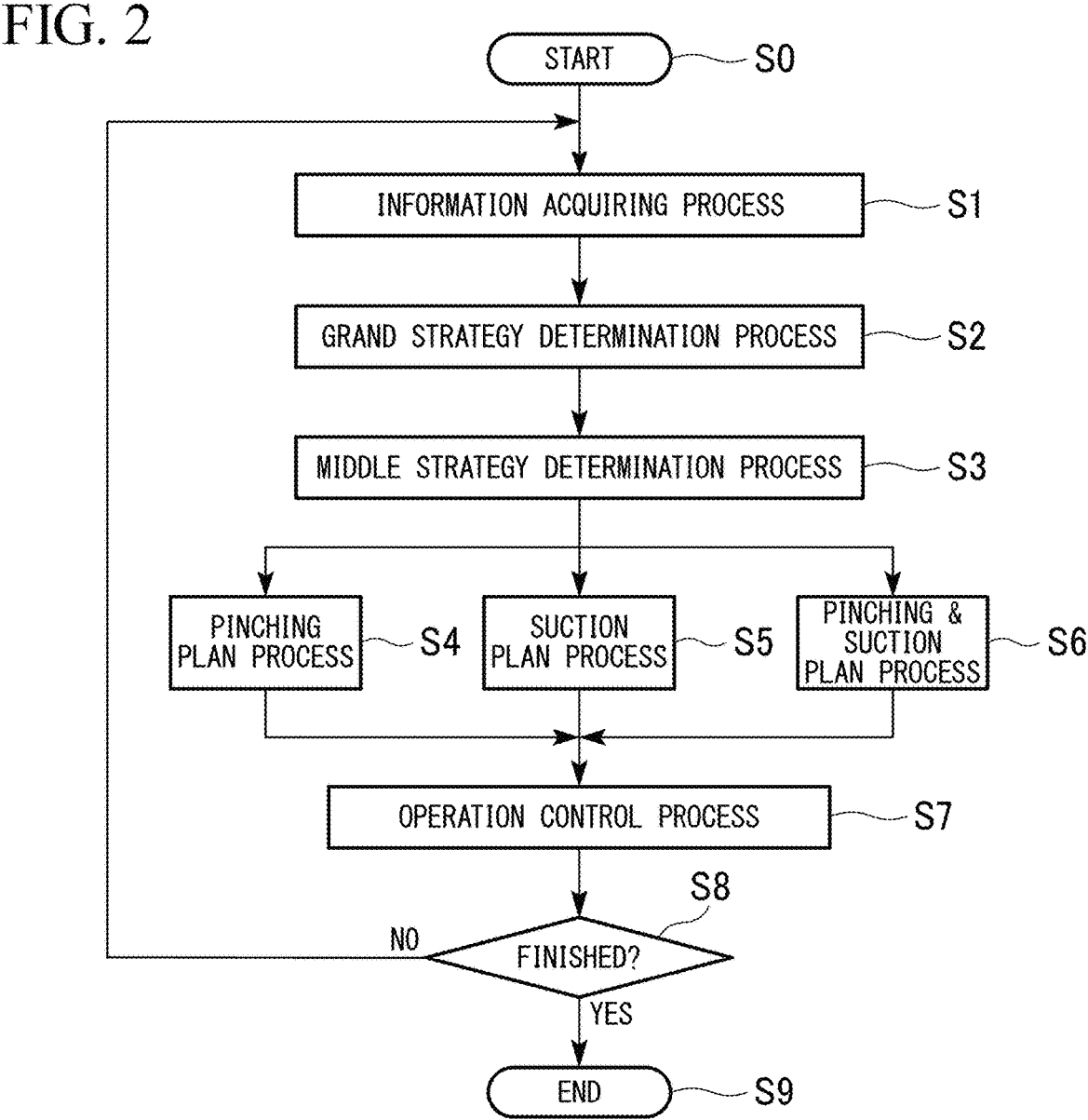
FIG. 2 is a control flowchart of a control apparatus of the handling apparatus.

An embodiment will be described by referring to FIGS. 1-13. FIG. 1 is a perspective view schematically showing a carrier system 1 having a handling apparatus 10 according to the present embodiment.

For example, the carrier system 1 is a handling system (picking system) configured for the physical distribution. The carrier system 1 is configured to move an object (object to be held, object to be carried) O positioned at a movement source V1 to a movement destination V2.

The movement source V1, for example, refers to the various conveyors and pallets, or a container such as a tote container and a folding container. The "container" broadly means a member (for example, a box shaped member) configured to be able to accommodate the object O. However, the movement source V1 is not limited to the examples shown above. In the description below, there are cases when the "movement source V1" is presented as a "pick-out source container V1".

In the movement source V1, various objects O having different sizes and weights are randomly placed therein. For example, each of the objects O as objects to be held is configured to have an uneven shape on at least part of a surface thereof. According to the present embodiment, external shapes of the objects O vary from a small value such as a five centimeters square shape to a large value such as a thirty centimeters square shape. The weights of the objects O vary from a light value such as several tens of grams to a heavy value such as several kilograms. However, the dimensions and the weights of the objects O are not limited to the examples shown above.

The movement destination V2, for example, is a container such as a tote container or a folding container. However, the movement destination V2 is not limited to the example shown above. In the description below, there may cases when the "movement destination V2" is presented as a "carrier destination container V2", and the "movement source V1" and the "movement destination V2" are generically presented as "containers". The carrier system 1 may be configured to move the objects O to the movement destination V2 other than the containers.

The carrier system 1 is not limited to the handling system configured for the physical distribution. The carrier system 1 is broadly applicable to an industrial robot system and other systems. The "carrier system" and the "handling apparatus" according to the present embodiment is not limited to the systems and apparatuses configured to move the objects as a main purpose, and the "carrier system" and the "handling apparatus" according to the present embodiment include the systems and apparatuses configured to carry (move) the objects as part of product assembly and other purposes.

As shown in FIG. 1, the carrier system 1 is configured to have the handling apparatus 10, a sensor 11, and a control apparatus 12. The control apparatus 12 may be integrated in the handling apparatus 10.

The handling apparatus 10, for example, is a robotic apparatus. The handling apparatus 10 is configured to hold the object O positioned in the pick-out source container V1 and move the held object O to the carrier destination container (storage region) V2. The handling apparatus 10 is configured to be able to communicate with the control apparatus by wired communication or wireless communication. In the present embodiment, the handling apparatus 10 includes a first handling apparatus 10A and a second handling apparatus 10B.

The first handling apparatus 10, for example, has an arm 100 and a first holding portion 200A disposed at a distal end of the arm 100.

The arm 100 is a movement mechanism configured to move the first holding portion 200A to a desired position. For example, the arm 100 is a six-axis vertical articulated robot arm. The arm 100 is configured to be able to take various positions and orientations. Similar to the arm and the hands of the human, the arm 100 can take various orientations so as to hold the objects. The arm 100, for example, is configured to have a plurality of arm members 101, and a plurality of rotation portions 102 which are rotatably connected to the plurality of arm members 101 respectively.

The arm 100 may be a three-axis cartesian coordinate robot. The arm 100 may be a mechanism having other configurations so as to move the first holding portion 200A to the desired position. For example, the arm 100 may be a flying object (for example, a drone) or the like configured to lift and move the first holding portion 200A by rotary wings.

The first holding portion 200A is a holding mechanism (end effector) configured to hold the objects O positioned in the pick-out source container V1. For example, the first holding portion 200A has a suction apparatus 203, and a suction portion 205 communicating with the suction apparatus 203. The first holding portion 200A is a suction-type hand configured to hold the object O by the suction method.

The first holding portion 200A may be a mechanism configured to hold the object O by other holding methods. For example, the first holding portion 200A may be configured to hold the object O utilizing the magnetic force. For example, the first holding portion 200A may be a holding portion (for example, a jamming gripper) configured to hold the object O utilizing the jamming phenomenon, which is configured by a flexible membrane in which powders are filled and a vacuum pump configured to extract the air from inside of the flexible membrane.

The suction apparatus 203, for example, is a vacuum pump. The suction apparatus 203 is configured to communicate with each of a plurality of suction portions 205 via a hose and the like. By driving the suction apparatus 203, the pressure in each suction portion 205 is lower than the atmospheric pressure such that the object O is sucked by the suction portion 205.

The suction portion 205 is disposed at a fingertip end of a grasping hand 202. A plurality of the suction portions 205 are disposed at the fingertip end of the grasping hand 202. The suction portion 205 has an external shape smaller than the external shape of the smallest object O positioned in the pick-out source container V1. The first handling apparatus 10A is configured to use only one or more than one suction portions 205 selected from the plurality of suction portions 205 to suck and hold the object O.

The second handling apparatus 10B, for example, has an arm (second arm) 100 and a second holding portion 200B disposed at a tip end of the arm 100. The arm 100 of the second handling apparatus 10B has the same configuration with the configuration of the arm 100 of the first handling apparatus 10A.

The second holding portion 200B is a holding mechanism (end effector) configured to hold the object O positioned in the pick-out source container V1. For example, the second holding portion 200B has a grasping hand 202, a suction apparatus 203, and a suction portion 205 communicating with the suction apparatus 203. The second holding portion 200B is configured as a hybrid hand configured to hold the object O by pinching and/or sucking.

The grasping hand 202 is a gripper shaped hand configured to pinch the object O by two fingers, and the grasping hand 202 is disposed at a tip end of the arm 100. The configuration of the grasping hand 202 is not limited thereto, for example, the grasping hand 202 may be configured as the gripper shaped hand to pinch the object O by three fingers.

The suction portion 205 is disposed at a fingertip end of the grasping hand 202. A plurality of the suction portion 205 may be disposed at the fingertip end of the grasping hand 202.

In the description below, there is a case in which the "first holding portion 200A" and the "second holding portion 200B" are generically presented as "holding portion 200".

The sensor 11 is controlled by the control apparatus 12 and configured to detect the plurality of objects O. The sensor 11 has a first sensor 11A and a second sensor 11B. The first sensor 11A and the second sensor 11B are connected with the control apparatus 12 by wired communication or wireless communication.

The first sensor 11A is a camera or various sensors disposed near the movement source V1 (for example, right above the movement source V1 or diagonally above the movement source V1). The first sensor 11A, for example, is configured to acquire information regarding the object O positioned at the movement source V1 and information regarding the movement source V1. The information acquired by the first sensor 11A, for example, is the "image data", "distance image data", the "shape data" and the like. The "distance image data" is the image data having the distance information (for example, the depth information from an arbitrary reference plane defined above the movement source V1) in one direction or more than one directions. The "shape data" is the information indicating the external shape of the object O. The information detected by the first sensor 11A is output to the control apparatus 12. The first sensor 11A may be configured as part of the handling apparatus 10.

The second sensor 11B is a camera or various sensors disposed near the movement destination container V2 (for example, right above the movement destination container V2 or diagonally above the movement destination container V2). The second sensor 11B, for example, is configured to detect the information regarding the shape of the movement destination container V2 (including the shapes of the inner wall surface and the partitions), and the information regarding the object O previously placed in the movement destination container V2. The information acquired by the second sensor 11B, for example, is the "image data", the "distance image data", the "shape data" and the like. The information detected by the second sensor 11B is output to the control apparatus 12. The second sensor 11B may be configured as part of the handling apparatus 10.

The control apparatus 12 is configured to manage and control the whole carrier system 1. For example, the control apparatus 12 is configured to acquire the information detected by the first sensor 11A and the second sensor 11B and control the handling apparatus 10 based on the acquired information. The control apparatus 12, for example, is an apparatus (computer) having a processor, a memory, a storage and the like so as to be able to execute a program.

Part or all of the functions of the control apparatus 12 are realized by one or more than one processors, for example, a Central Processing Unit (CPU) or a Graphics Processing Unit (GPU), executing a program stored in a program memory. However, part or all of the functions may be realized by the hardware (for example, a circuitry) such as a Large Scale Integration (LSI), an Application Specific Integrated Circuit (ASIC), a Field-Programmable Gate Array (FPGA), a Programmable Logic Device (PLD) and the like. Part or all of the functions may be realized by a combination of the software and the hardware. The storage is configured by a flash memory, an Electrically Erasable Programmable Read-Only Memory (EEPROM), a Read-Only Memory (ROM), or a Random Access Memory (RAM) and the like.

The shape data regarding the object O as the picking target is recorded in the storage of the control apparatus 12. The shape data stored in the storage is defined by a local coordinate systems of the object O.

Next, the operations of the carrier system 1 will be described. The description will be made following the control flowchart of the control apparatus 12 shown in FIG. 2.

When the control apparatus 12 is initiated, the control apparatus 12 is configured to perform the initialization of the handling apparatus 10 and the sensor 11 and then begin the control of the handling apparatus 10 (Step S0). Next, the control apparatus 12 proceeds to execute Step S1.

In Step S1, the control apparatus 12 receives an order list of the objects O as the picking target from the operator or the system. The control apparatus 12 acquires the image data, the distance image data, the shape data and the like regarding the objects O of the pick-out source container V1 by using the first sensor 11A. The control apparatus 12 determines whether the objects O included in the order list is in the pick-out source container V1. The control apparatus acquires the information regarding the shape, position and the orientation of the objects O as the picking target (information acquiring process).

Figure 3:
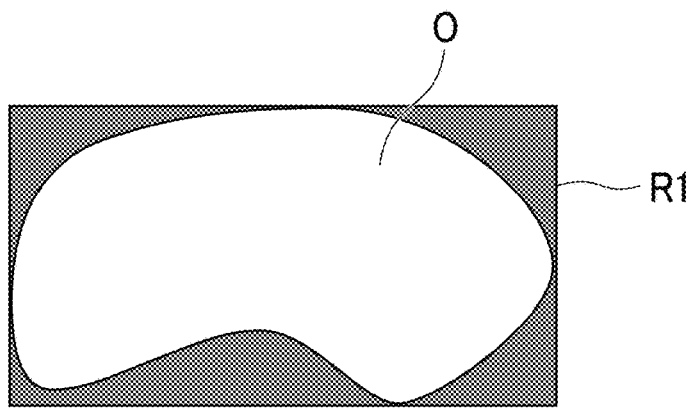
FIG. 3 is a view showing a provisional mask region in data of an object image.

FIG. 3 is a view showing a provisional mask region R1 in the image data of the object O.

The control apparatus 12 assigns a rectangular region (circumscribed rectangular region) which is circumscribed by the object O as the picking target from the image data as a "provisional mask region R1" utilizing the conventional image segmentation method. The image segmentation may be a method using the machine learning.

Figure 4:
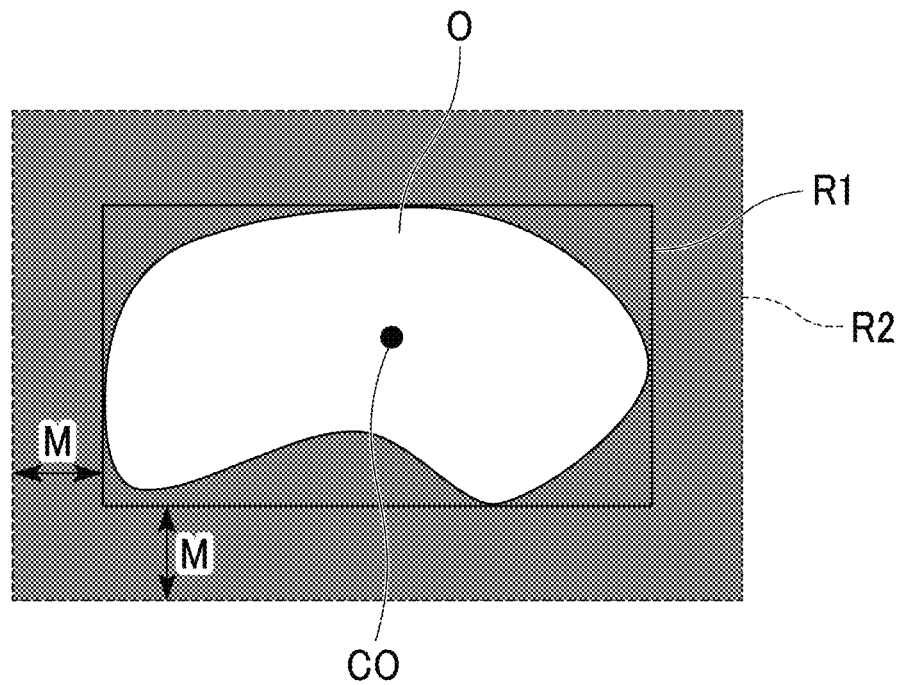
FIG. 4 is a view showing a mask region in the data of the object image.

FIG. 4 is a view showing a mask region R2 in the image data of the object O.

The control apparatus 12 determines a region by extending the provisional mask region R1 in the vertical direction and the horizontal direction as a "mask region R2". The mask region R2 is determined by extending the circumscribed rectangular region by a margin M only in the vertical direction and the horizontal direction. The control apparatus 12 determines whether there is space around the object O available for the grasping hand 202 to enter using the extended mask region R2, in a case in which the holding method by the holding portion 200 is the pinching method.

Figure 5:
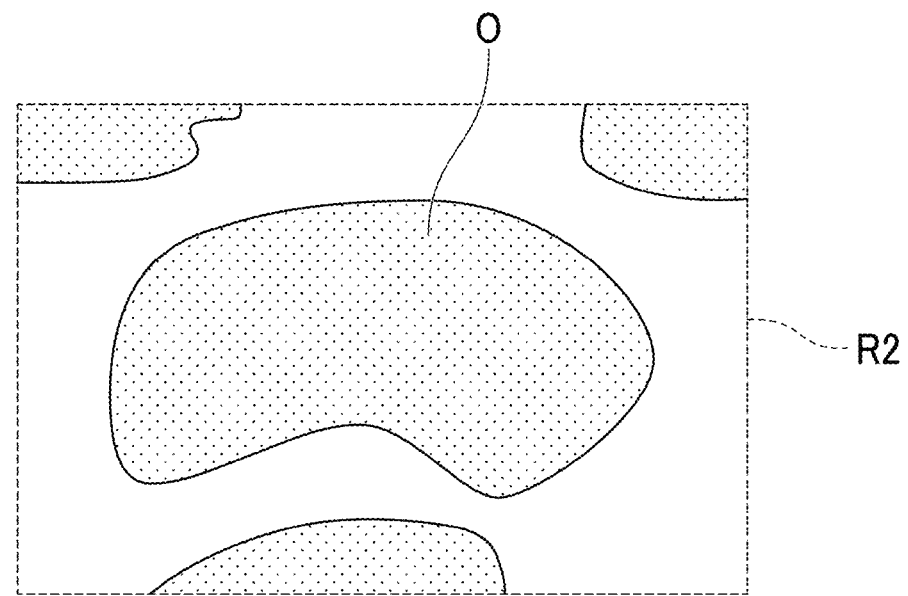
FIG. 5 is a view showing a depth image of the object.

FIG. 5 is a view showing a depth image D of the object O.

The control apparatus 12 generates the depth image D by visualizing the depth information of the object O in the mask region R2 by using the distance image data. A scale of the depth image D can be changed due to the holding method by the holding portion 200. The scale of the depth image D, for example, can be set to 1 millimeter per pixel.

Figure 6:
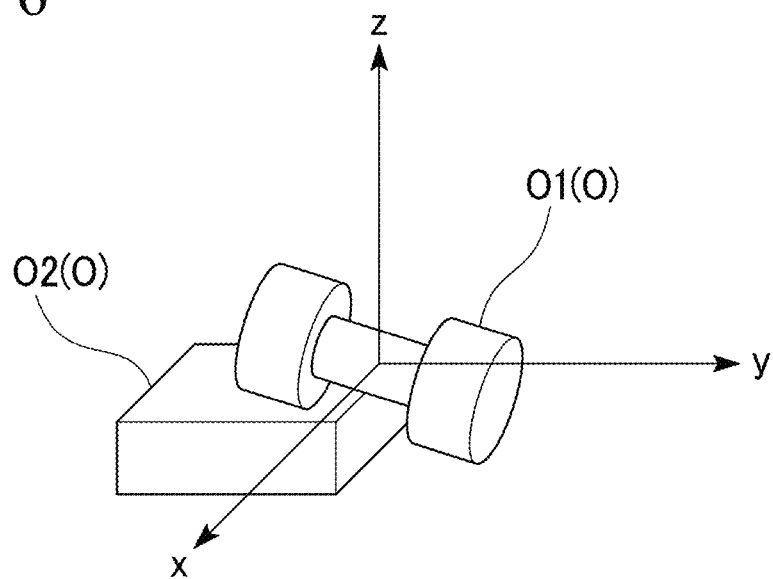
FIG. 6 is a view showing a three-dimensional position and an orientation of the object.

FIG. 6 is a view describing a three-dimensional position and orientation of the object O. In FIG. 6, the objects O having different shapes are described as "O1" and "O2".

The control apparatus 12 calculates the three-dimensional position and orientation of the object O1 using the acquired image data of the object O1. The control apparatus 12 converts the shape data of the object O1 in the local coordinate systems thereof which is stored in the storage to the world coordinate systems (X-axis, Y-axis, Z-axis) using the transformation matrix. As shown in FIG. 6, Z-axis direction in the world coordinate systems is the depth direction from the arbitrary reference plane defined above the movement source container V1. The control apparatus 12 calculates the three-dimensional position and the orientation of the object O1 by comparing the acquired image data of the object O1 and the shape data converted into the world coordinate systems.

Figure 7:
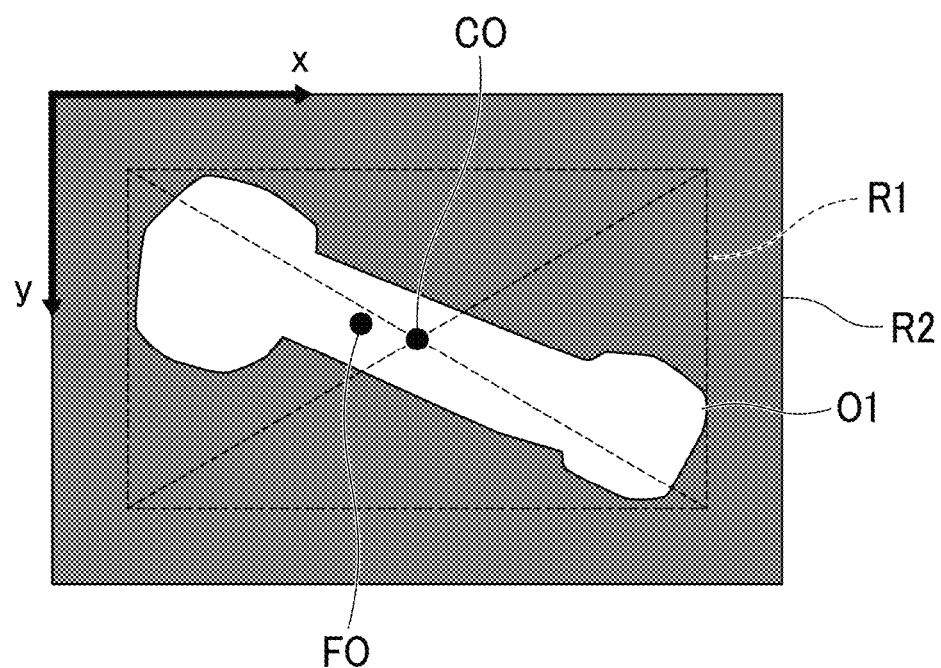
FIG. 7 is a view showing the mask region to which information regarding the three-dimensional position and the orientation is added.

FIG. 7 is a view showing the mask region R2 which is added by the information regarding the three-dimensional position and orientation. The control apparatus 12 determines the three-dimensional position of the reference of the object O1 as the center CO of the circumscribed rectangular region (provisional mask area region R1) in the mask image R2. The control apparatus 12 may calculate and utilize the centroid FO of the object O1 rather than the center CO of the circumscribed rectangular region in consideration of making the pinching by the grasping hand 202 easy.

The control apparatus 12 may utilize a database storing the three-dimensional positions and the orientations of the objects O when picking for the objects O are previously successful. The control apparatus 12 can output a recommended holding method and a recommended holding position with regard to the object O using the database.

Next, the control apparatus 12 executes Step S2. During Step S2, the control apparatus 2 calculates a "score" as the ease of holding the objects O by the holding portion 200 based on the information acquired in Step S1. The control apparatus 12 calculates the score per (1) each object O, (2) each holding method, and (3) each type of the handling apparatus 10 (grand strategy determination process).

In Step S2, the score $S_{H\alpha,\beta}$ (Ii, j) per (1) each object O, (2) each holding method, and (3) each type of the handling apparatus 10, for example, is calculated by an evaluation function shown in Math 1.

(Math 1)

$$S_{H\alpha,\beta}(I_{i,j}) = (w_1 \cdot R + w_2 \cdot C + w_3 \cdot L + w_4 \cdot F) + (w_5 \cdot G + w_6 \cdot W + w_7 \cdot B + w_8 \cdot L + w_9 \cdot F)$$ (MATH 1)

In Math 1, the parameter $\alpha$ represents the type of the handling apparatus 10 (first handling apparatus 10A, second handling apparatus 10B and the like). The parameter $\beta$ represents the holding method (suction, pinching, hybrid and the like). The parameter $I_{i,j}$ represents the mask region R2 of an arbitrary object O. The parameters $w_1$-$w_9$ represent weights of the evaluation functions. The parameter R represents a ratio of the absorbable surface. The parameter C represents a ratio of the central plane. The parameter L represents an arrangement ratio of the object O. The parameter F represents a margin of the holding force with respect to the object O. The parameter G represents a ratio of the gaps among the plurality of objects O. The parameter W represents a margin of an opening width of the hand (margin of the holding portion). The parameter B represents an unevenness ratio of the object O.

The evaluation function shown in Math 1 is made by a linear combination of each evaluation item. The evaluation function for calculating the score may use an average value for each evaluation item, and the evaluation function may be changed to a non-linear function. The evaluation items are not limited to the items disclosed in Math 1, for example, and may be amounts depending on the physical characteristic of the objects O and the grasping hand 202.

The control apparatus 12 selects the type of the handling apparatus 10 with the highest score as the type of the handling apparatus 10 used for the picking. The type of the handling apparatus 10 (type of the holding portion 200) suitable for the picking is selected per each object O. At this time, the control apparatus 12 selects the type of the handling apparatus 10 (type of the holding portion 200) without specifically calculating the position for holding the object O and the orientation of the arm 100. According to the present embodiment, the control apparatus 12 selects either of the first handling apparatus 10A with the first holding portion 200A or the second handling apparatus 10B with the second holding portion 200B.

Next, the control apparatus 12 executes Step S3. During Step S3, the control apparatus 12 calculates the score as the ease for the holding operation in consideration of the ease of holding the object O by the holding portion 200 and the loading situation of the objects O based on the information acquired in Step S1. The control apparatus 12 calculates the score (1) per each object O and (2) per each holding method (middle strategy determination process).

Figure 8:
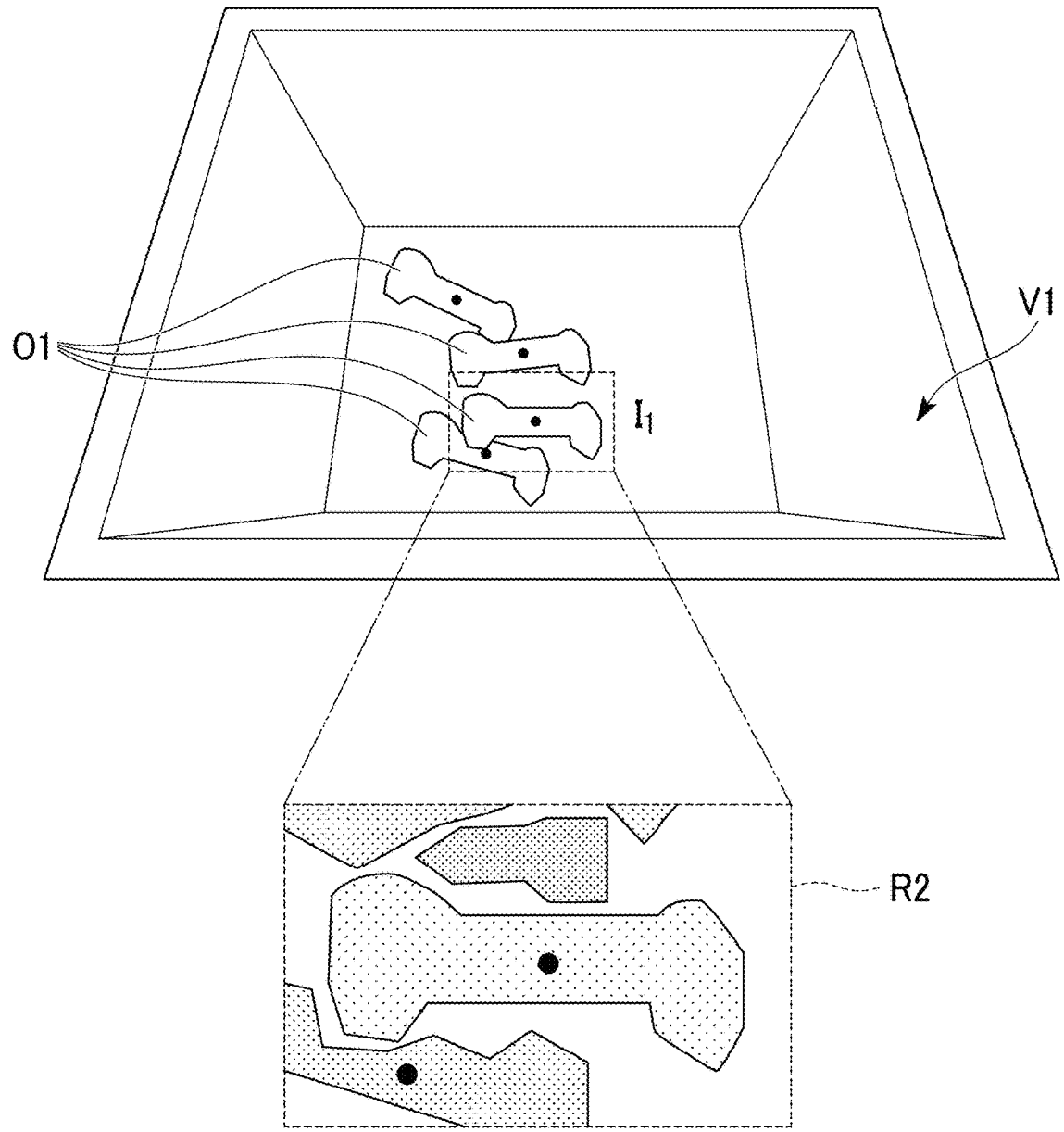
FIG. 8 is a view showing the object whose score is calculated.
Figure 9:
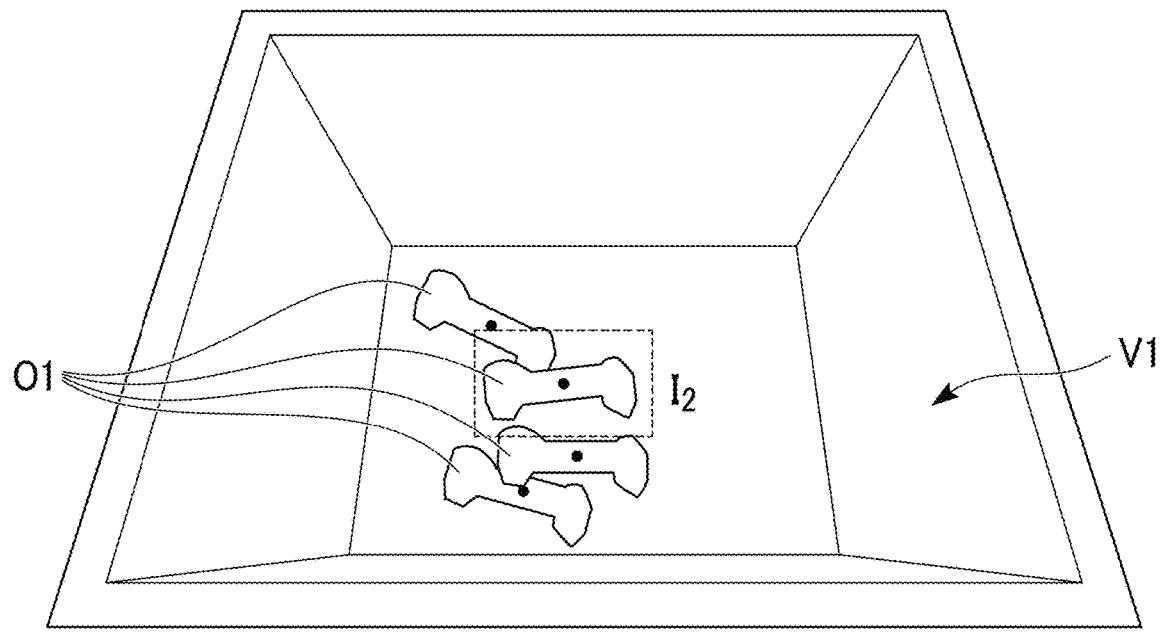
FIG. 9 is a view showing the object whose score is calculated.
Figure 10:
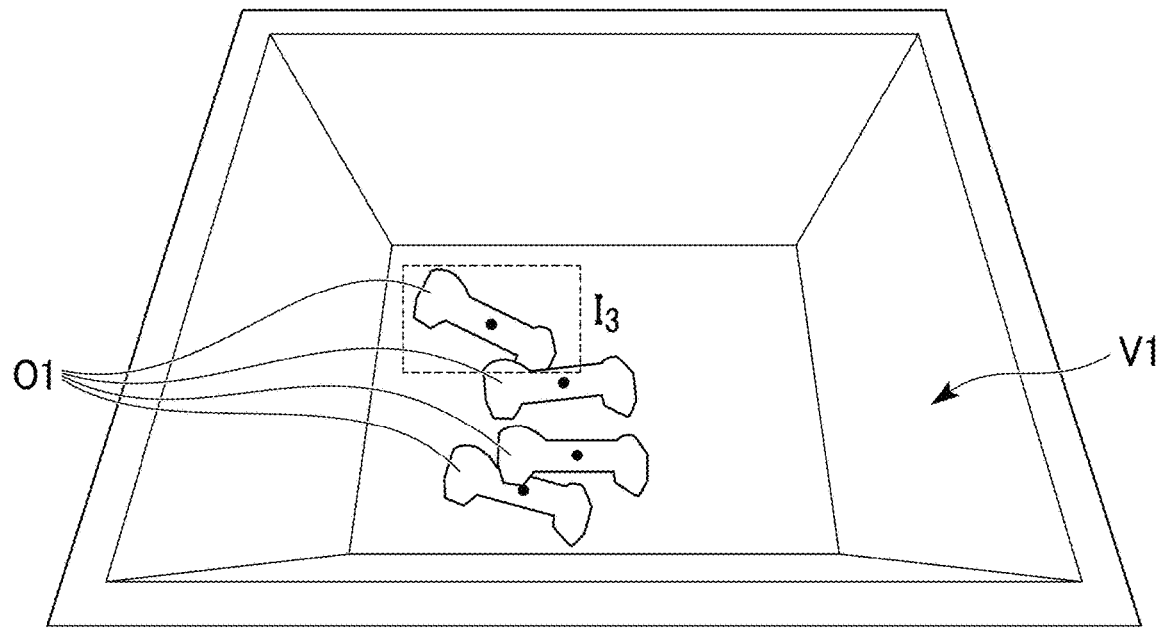
FIG. 10 is a view showing the object whose score is calculated.

FIGS. 8-10 are views showing the object O1 whose score is calculated.

In the situation where the suction S is used as the holding method, the score is calculated by the evaluation function shown by Math 2 which is partially the same as the evaluation function used in Step S2. The parameters $I_1$-$I_3$ shown in FIGS. 8-9 show the examples of the mask region R2 of the object O1 whose score is calculated.

(Math 2)

$$Ii,j,S = w_1 \cdot R + w_2 \cdot C + w_3 \cdot L + w_4 \cdot F \quad \text{(MATH 2)}$$

In the situation where the pinching P is used as the holding method, the score is calculated by the evaluation function shown by Math 3 which is partially the same as the evaluation function used in Step S2.

(Math 3)

$$Ii,j,P = w_5 \cdot G + w_6 \cdot W + w_7 \cdot B + w_8 \cdot L + w_9 \cdot F \quad \text{(MATH 3)}$$

Figure 11:
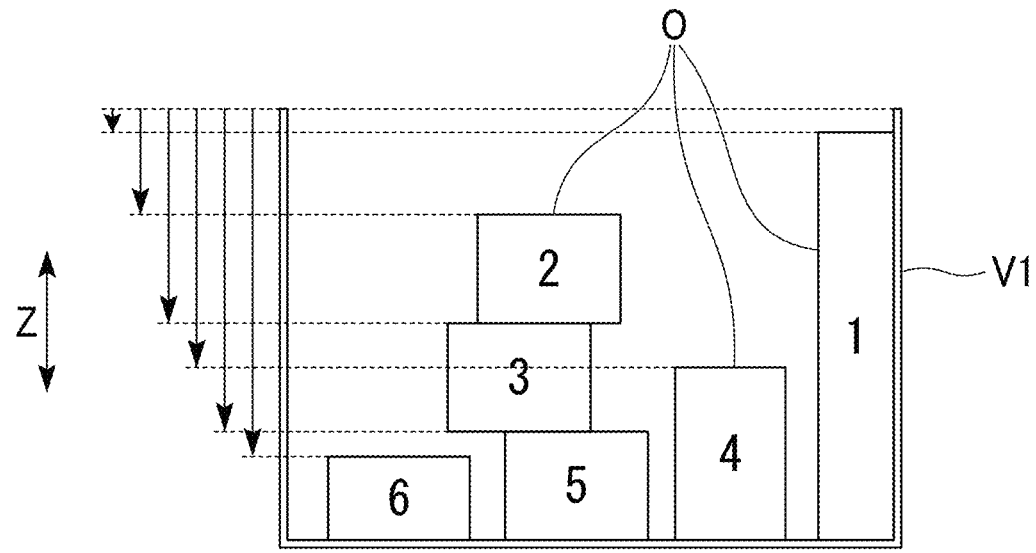
FIG. 11 is a view explaining an evaluation function in consideration of the loading situation of the object.
Figure 12:
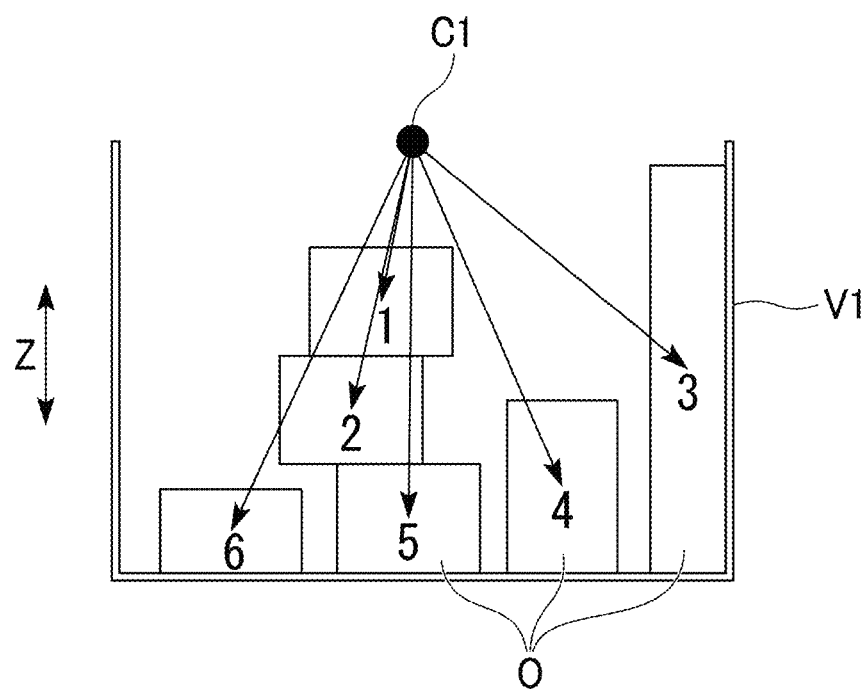
FIG. 12 is a view explaining an evaluation function in consideration of the loading situation of the object.
Figure 13:
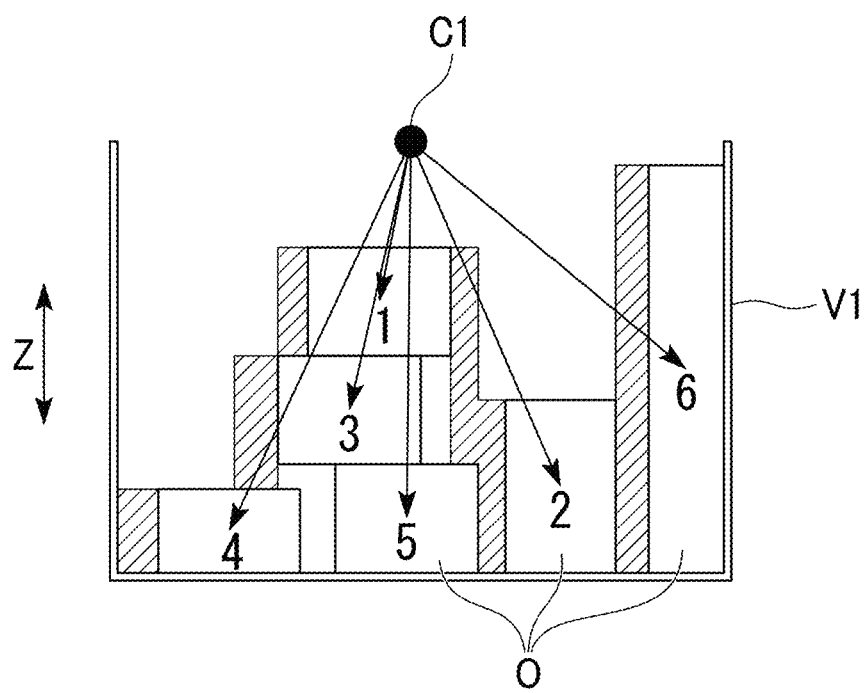
FIG. 13 is a view explaining an evaluation function in consideration of the loading situation of the object.

The control apparatus 12 may change the evaluation function for calculating the score in further consideration of the loading situation of the objects O. FIGS. 11-13 are views showing the evaluation function in consideration of the loading situation of the objects O. Numbers shown in FIGS. 11-13 are sequences of the scores for each object O which are calculated by the evaluation function.

As shown in FIG. 11, the control apparatus may give priority to the objects O disposed at a high position of the pick-out source container V1. In this case, for example, the evaluation function is calculated due to the parameter $f_0$ as shown in Math 4. In Math 4, the parameter z represents a height in the direction Z.

(Math 4)

$$f_0 = z \quad \text{(MATH 4)}$$

As shown in FIG. 12, the control apparatus 12 may give priority to the object O which is at the high position of the pick-out source container V1 while at the center of the pick-out source container V1. In this case, for example, the calculation function is calculated due to the parameter $f_1$ shown in Math 5 and Math 6. In Math 5, the parameter represents a distance between the center of the object O and a center C1 of the topmost portion of the pick-out source container V1. In Math 6, the parameter (x, y, z) represents the position coordinate of the object O in the world coordinate system. The parameter $(x_o, y_o, z_o)$ represents the coordinate of the topmost portion of the pick-out source container V1.

(Math 5)

$$f_1 = \frac{1}{\exp(dist)} \quad \text{(MATH 5)}$$

(Math 6)

$$dist = sqrt\left((x - x_c)^2 + (y - y_c)^2 + (z - z_c)^2\right) \quad \text{(MATH 6)}$$

As shown in FIG. 13, the control apparatus 12 may give priority to the object O which is at the high position of the pick-out source container V1, positioned at the center of the pick-out source container V1, and easy to be held. In this case, for example, the evaluation function is calculated due to the parameter $f_2$ as shown in Math 7. The parameter $f_2$ is a function to evaluate the unevenness of the object O. In Math 7, the parameter $I_{depth}$ represents the depth image D. The evaluation function, for example, is calculated due to the parameter $f_3$ shown in Math 8. The parameter $f_3$ represents a function to evaluate the oblateness degree of the object O. In Math 7, the parameter $(x_d, y_d)$ represents the variance of the region occupied by the object O in the X-axis direction and the Y-axis direction.

(Math 7)

$$f_2 = \frac{std(I_{depth})}{mean\ (I_{depth})} \quad \text{(MATH 7)}$$

(Math 8)

$$f_3 = argmax(axis1, axis2) \quad \text{(MATH 8)}$$

(Math 9)

$$axis1 = \frac{x_d}{(x_d + y_d)} \quad \text{(MATH 9)}$$

(Math 10)

$$axis2 = \frac{y_d}{(x_d + y_d)} \quad \text{(MATH 10)}$$

The control apparatus 12 may use the evaluation function f by integrating the function $f_1$, the function $f_2$, the function $f_3$, and the function $f_4$ as shown in Math 11. For example, the weight $w_0$ is 0.0, the weight $w_1$ is 0.34, the weight $w_2$ is 0.33, and the weight $w_3$ is 0.33.

(Math 11)

$$f = w_0 \cdot f_0 + w_1 \cdot f_1 + w_2 \cdot f_2 + w_3 \cdot f_3 \quad \text{(MATH 11)}$$

The evaluation function f shown in Math 11 is made by linearly combining each evaluation item. The evaluation function f may use the average value by each evaluation item, and the evaluation function f may be changed into a non-linear function. The evaluation items are not limited to the items shown in Math 9, for example, the evaluation items may be amounts depending on the physical characteristic of the objects O and the grasping hand 202.

Table 1 is a table showing the scores calculated per each object and each holding method. Table 2 is a table showing combinations of the object O and the corresponding holding method wherein the object O is sorted in a descending order of the score.

TABLE 1

|  | OBJECT 1 | OBJECT 2 | OBJECT 3 | OBJECT 4 |
|---|---|---|---|---|
| PINCHING | 0.5 | 0.55 | 0.4 | 0.2 |
| SUCTION | 0.6 | 0.9 | 0.8 | 0.1 |
| PINCHING & SUCTION | 0.7 | 0.5 | 0.4 | 0.21 |

TABLE 2

| SEQUENCE | SCORE | OBJECT | HOLDING METHOD |
|---|---|---|---|
| 1 | 0.9 | OBJECT 2 | SUCTION |
| 2 | 0.8 | OBJECT 3 | SUCTION |
| 3 | 0.7 | OBJECT 1 | PINCHING & SUCTION |
| 4 | 0.6 | OBJECT 1 | SUCTION |
| ... | ... | ... | ... |

The control apparatus 12 sorts the scores shown in Table 1 which are calculated by each object and each holding method in the descending order of the score as shown in Table 2. The control apparatus 12 selects the combination of the object O with a high score and the holding method as an object O with a high priority and the corresponding holding method. At this time, the control apparatus 12 selects the holding object O and the holding method without specifically calculating the position for holding the object O and the orientation of the arm 100.

The control apparatus 12, for example, selects the object O with a score equal to or higher than a predetermined score as the holding object O. The control apparatus 12 determines the sequence for holding the plurality of objects O based on the score sequence shown in Table 2 (sequence determination process).

Next, the control apparatus 12 executes Steps S4, S5, and S6 corresponding to the holding methods selected during Step S3, respectively. The control apparatus 12 specifically calculates the position for holding the object O and the orientation of the arm 100 at the time of holding the object O which are selected during Step S3 (plan generation process).

Step S4 is executed when the holding method for the object O is selected to be the "pinching" during Step S3. In Step S4, the control apparatus 12 specifically calculates the position for pinching the object O and the orientation of the arm 100 at the time of pinching the object O by the conventional method. In the case when the "pinching" is not included in the holding method for the object O during Step S3, the control apparatus 12 does not execute Step S4.

Step S5 is executed when the holding method for the object O is selected to be the "suction" during Step S3. In Step S5, the control apparatus 12 specifically calculates the position for sucking the object O and the orientation of the arm 100 at the time of sucking the object O by the conventional method. In the case when the "suction" is not included in the holding method for the object O during Step S3, the control apparatus 12 does not execute Step S5.

Step S6 is executed when the holding method for the object O is selected to be the "pinching and suction (hybrid)" during Step S3. In Step S6, the control apparatus 12 specifically calculates the position for pinching and sucking the object O and the orientation of the arm 100 at the time of pinching and sucking the object O by the conventional method. In the case when the "pinching and suction" is not included in the holding method for the object O during Step S3, the control apparatus 12 does not execute Step S6.

The calculation amounts for calculating the position for holding the object O and the orientation of the arm 100 is extremely large. The control apparatus 12 only has to calculate the position for holding the object O and the orientation of the arm 100 with respect to the selected object O. Accordingly, comparing to other carrier systems which are configured to calculate the positions for holding the objects O and the orientations of the arm 100 so as to select the object O to hold, according to the carrier system 1, the necessary calculation amounts can be significantly reduced.

Next, the control apparatus 12 proceeds to execute Step S7. In Step S7, controls the holding portion 200 and the arm 100 according to the position for holding the object O and the orientation of the arm 100 which are calculated in Step S4, S5, S6 (operation control process). The selected object O is carried from the pick-out source container V1 to the carrier destination container V2 by the handling apparatus 10.

Next, the control apparatus 12 proceeds to execute Step S8. In Step S8, the control apparatus 12 determines whether the object O is remained in the pick-out source container V1. In the case when the object O is remained in the pick-out source container V1, the control apparatus 12 executes Step S1 again. In the case when the object O is not remained in the pick-out source container V1, the control apparatus 12 processed to execute Step S9 to finish the control.

According to the carrier system 1 according to the present embodiment, the holding strategy for holding the object O can be efficiently determined. The control apparatus 12 of the carrier system 1 is configured to select the holding strategy without specifically calculating the position for holding the object O and the orientation of the arm 100. The holding strategy is to select, for example, the type of the used handling apparatus 10, the object O to hold, and the holding method. The control apparatus 12 of the carrier system 1 only has to calculate the positon for holding the object O and the orientation of the arm 100 with respect to the selected object O only such that the necessary calculation amount can be significantly reduced.

According to the above-described embodiments, the handling apparatus 10 has the first handling apparatus 10A and the second handling apparatus 10B. The handling apparatus 10 may further have another handling apparatus configured to hold the object O by other holding methods.

The calculation method of the score in Step S2 and Step S3 are not limited to the algorithm due to the rule base described above, and the calculation method may be executed due to the algorithm using the machine learning. For example, in the case of supervised learning, the defined evaluation function described above can be used as the evaluation value during the learning. With regard to the learning algorithm, it is not limited to the supervised learning and can be changed due to the type of the learning such as the unsupervised learning, the reinforcement learning, and the like.

According to the at least one embodiment described above, the holding strategy is selected without specifically calculating the position for holding object O and the orientation of the arm 100 such that the holding strategy for holding the objects can be efficiently determined.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling apparatus, comprising:
an arm having a joint;
a holding portion attached to the arm and configured to hold an object;
a sensor configured to detect a plurality of the objects; and
a control apparatus configured to control the arm and the holding portion,
wherein the control apparatus is configured to:
calculate an ease of holding the object by the holding portion as a score based on information acquired by the sensor with respect to each object and each holding method,
select the object to hold and the holding method according to the score, and
calculate a position for holding the selected object and an orientation of the arm.

2. The handling apparatus according to claim 1, further comprising:
a second arm having a joint; and
a second holding portion configured to have a holding method different with the holding method of the holding portion,
wherein the control apparatus is configured to select either of the holding portion or the second holding portion according to the score.

3. The handling apparatus according to claim 1, wherein the control apparatus is configured to determine a sequence of holding the plurality of objects according to the score.

4. The handling apparatus according to claim 1, wherein the holding methods by the holding portion include a pinching method and a suction method.

5. The handling apparatus according to claim 1,
wherein the sensor is a camera, and
the control apparatus is configured to:
define a circumscribed rectangular region of the object which is imaged by the sensor as a provisional mask region, and
calculate the score according to a mask region by extending the provisional mask region.

6. The handling apparatus according to claim 1, wherein the control apparatus is configured to calculate the score according to at least one of a ratio of a absorbable surface of the object, a ratio of a central plane, an arrangement ratio of the object, a margin of a holding force for holding the object, a ratio of gaps among the plurality of objects, a margin of the holding portion at the time of holding the object, and an unevenness ratio of the object.

7. The handling apparatus according to claim 1, wherein the control apparatus is configured to calculate the score according to at least one of a height of the loaded object, a distance from a center of a topmost portion of the container at which the object is placed to the object, an unevenness degree of the object, and an oblateness degree of the object.

8. The handling apparatus according to claim 1, wherein the control apparatus is configured to control the arm and the holding portion according to the calculated position to hold the object and the orientation of the arm.

9. A control apparatus configured to control a carrier system, wherein the carrier system has an arm having a joint, a holding portion attached to the arm and configured to hold an object, and a sensor configured to detect a plurality of the objects, the control apparatus is configured to:
calculate an ease of holding the object by the holding portion as a score based on information acquired by the sensor with respect to each object and each holding method,
select the object to hold and the holding method according to the score, and
calculate a position for holding the selected object and an orientation of the arm.

10. The control apparatus according to claim 9, wherein the control apparatus is configured to determine a sequence of holding the plurality of objects according to the score.

11. The control apparatus according to claim 9,
wherein the sensor is a camera, and
the control apparatus is configured to:
define a circumscribed rectangular region of the object which is imaged by the sensor as a provisional mask region, and
calculate the score according to a mask region by extending the provisional mask region.

12. The control apparatus according to claim 9, wherein the control apparatus is configured to calculate the score according to at least one of a ratio of a absorbable surface of the object, a ratio of a central plane, an arrangement ratio of the object, a margin of a holding force for holding the object, a ratio of gaps among the plurality of objects, a margin of the holding portion at the time of holding the object, and an unevenness ratio of the object.

13. The control apparatus according to claim 9, wherein the control apparatus is configured to calculate the score according to at least one of a height of the loaded object, a distance from a center of a topmost portion of the container at which the object is placed to the object, an unevenness degree of the object, and an oblateness degree of the object.

14. The control apparatus according to claim 9, wherein the control apparatus is configured to control the arm and the holding portion according to the calculated position to hold the object and the orientation of the arm.

15. A non-volatile recording medium storing a control program to control a carrier system, wherein the carrier system has an arm having a joint, a holding portion attached to the arm and configured to hold an object, a sensor configured to detect a plurality of the objects, and a control apparatus configured to control the arm and the holding portion, the control program is executed to make the control apparatus to:
calculate an ease of holding the object by the holding portion as a score based on information acquired by the sensor with respect to each object and each holding method,
select the object to hold and the holding method according to the score, and
calculate a position for holding the selected object and an orientation of the arm.

16. The non-volatile recording medium storing a control program according to claim 15, wherein the control program is executed to make control apparatus to determine a sequence of holding the plurality of objects according to the score.

17. The non-volatile recording medium storing a control program according to claim 15,
wherein the sensor is a camera, and
the control program is executed to make the control apparatus to:

define a circumscribed rectangular region of the object which is imaged by the sensor as a provisional mask region, and calculate the score according to a mask region by extending the provisional mask region.

18. The non-volatile recording medium storing a control program according to claim 15, wherein the control program is executed to make the control apparatus to calculate the score according to at least one of a ratio of a absorbable surface of the object, a ratio of a central plane, an arrangement ratio of the object, a margin of a holding force for holding the object, a ratio of gaps among the plurality of objects, a margin of the holding portion at the time of holding the object, and an unevenness ratio of the object.

19. The non-volatile recording medium storing a control program according to claim 15, wherein the control program is executed to make the control apparatus to calculate the score according to at least one of a height of the loaded object, a distance from a center of a topmost portion of the container at which the object is placed to the object, an unevenness degree of the object, and an oblateness degree of the object.

20. The non-volatile recording medium storing a control program according to claim 15, wherein the control program is executed to make the control apparatus to control the arm and the holding portion according to the calculated position to hold the object and the orientation of the arm.

* * * * *